Jan. 28, 1936.  F. R. DIPPMAN  2,029,061
SPRAY GUN
Filed Sept. 2, 1931  2 Sheets-Sheet 1

Inventor
FRED R. DIPPMAN
By
Attorney

Inventor
FRED R. DIPPMAN
By
Attorney

Patented Jan. 28, 1936

2,029,061

UNITED STATES PATENT OFFICE 2,029,061

SPRAY GUN

Fred R. Dippman, Mansfield, Ohio, assignor to The Ohio Brass Company, Mansfield, Ohio, a corporation of New Jersey Application September 2, 1931, Serial No. 560,795

14 Claims. (Cl. 184—15)

My invention relates to mechanism for the purpose of spraying a liquid material upon a conductor from a moving vehicle.

It has been found that it is a decided advantage in many respects to lubricate the trolley wire. This is especially true where the current collector at the end of the trolley pole is of the sliding or shoe type.

If the collector is of the rolling or wheel type the benefits derived from lubricating the trolley wire are very much less. This is probably due to the fact that a wheel will have a very small contact with the trolley wire and hence as it moves along the wire and breaks contact therewith an arc will take place which pits the wheel and pits the wire and this will take place regardless of whether the wire is lubricated or not.

It has been found that a trolley wire which has been somewhat pitted from the use of a wheel can have its contact surface smoothed by replacing all the wheels with shoes and frequently lubricating the trolley wire.

A well-lubricated trolley wire upon which shoes are used will last very much longer than an unlubricated wire and the shoes will also last longer.

Therefore, the object of my invention is to provide means for applying a lubricant to the trolley wire and a method of lubricating the wire.

My invention resides in the new and novel construction, combination and relation of the various parts herein described and shown in the drawings accompanying this specification.

In the drawings:—

Figure 1:
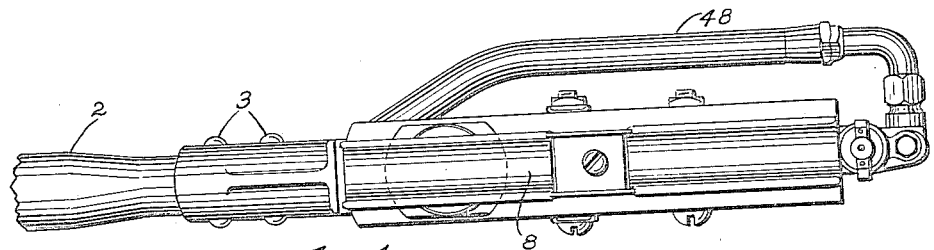
Fig. 1 is a top view of my invention which is secured to the end of a trolley pole or other support.
Figure 2:
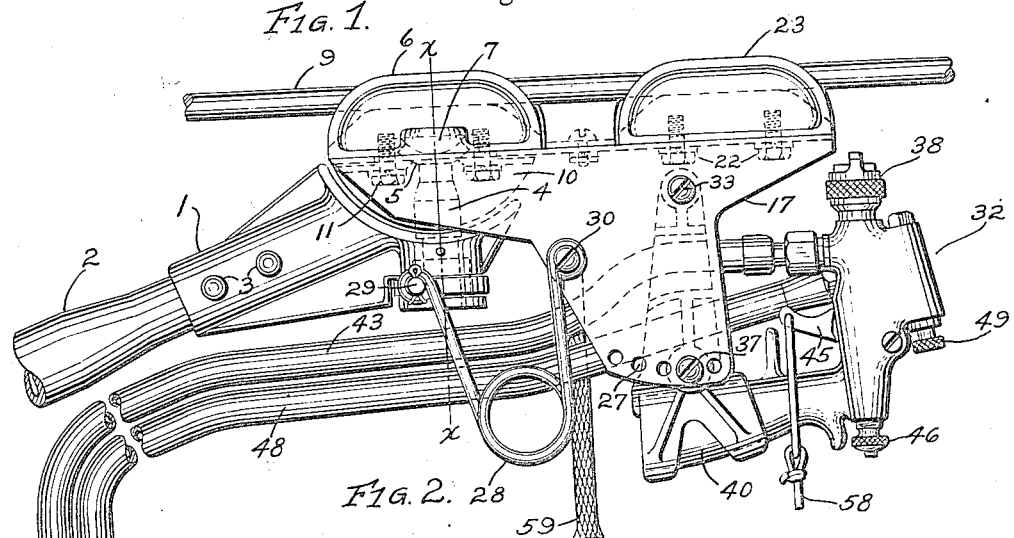
Fig. 2 is a side view of the mechanism shown in Fig. 1 and in addition other parts required to complete my invention.
Figures 3, 4:
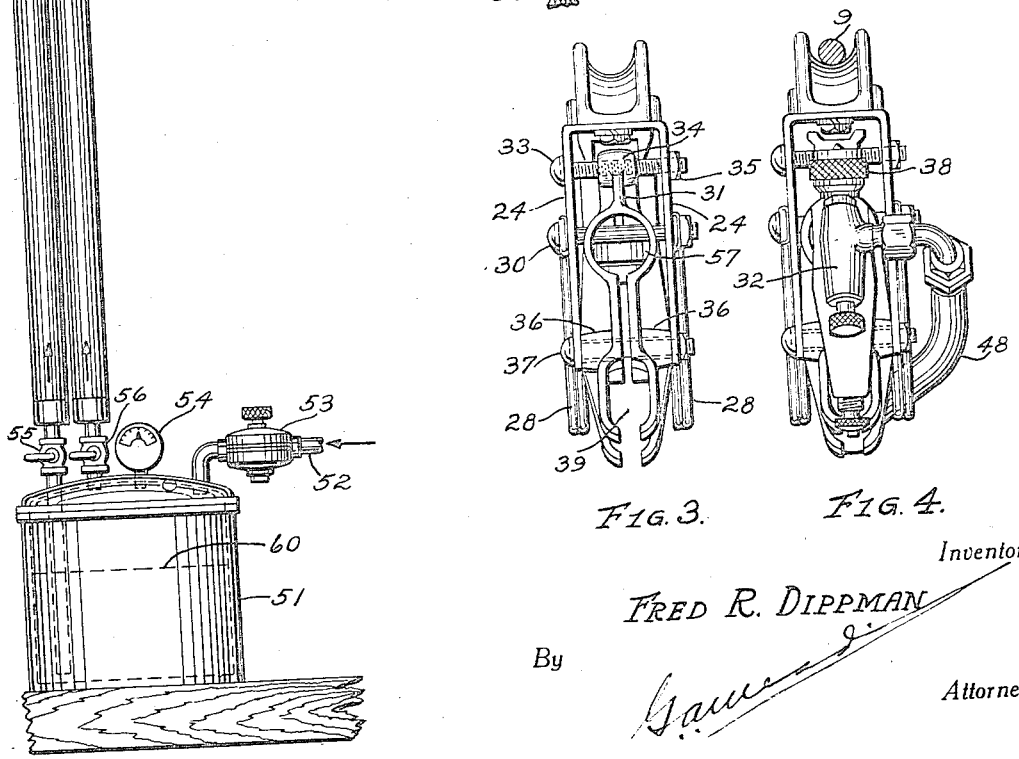
Fig. 3 is an end view of Fig. 2 without the air gun as later described.
Fig. 4 is an end view of Fig. 2 including the air gun.
Figure 8:
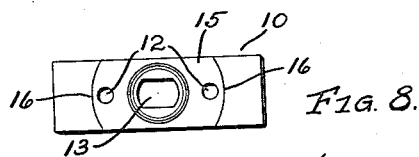
Fig. 8 is a top view of the support for the main trolley shoe as later described.

In the preferred embodiment of my invention I use a main supporting member 1 arranged to be mounted on a trolley pole 2 or other support and secured thereto by means of rivets 3. Mounted on the member 1 is an upright pedestal member 4 having a cup-shaped portion 5 at its upper end with a spheric concave surface. The main current collecting shoe 6 has a projection 7 on its lower face having a convex spheric surface which corresponds to the concave spheric surface of the pedestal 4. The shoe 6 has a groove 8 the surface of which contacts with the trolley wire 9. The shoe support 10 is shown in detail in Figs. 8, 9 and 10 and is secured to the shoe by means of the bolts 11 passing through the holes 12. The pedestal 4 projects through the central hole 13 and when the member 10 is secured in position and with the shoe 6 as shown in Fig. 2 the shoe and member 10 are free to pivot in a vertical plane about the center of radius of the said spheric concave surface and is also free to pivot about the vertical axis of the pedestal 4.

Figure 5:
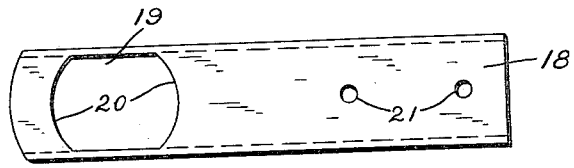
Fig. 5 is a top view of the body shown in Fig. 2.
Figure 6:
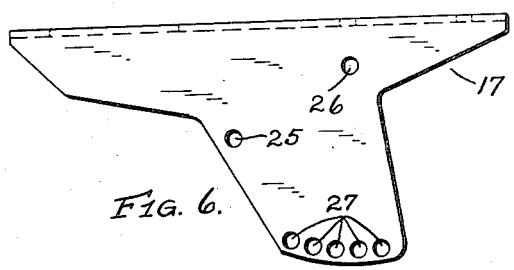
Figs. 6 and 7 are side and end views respectively of Fig. 5.
Figure 7:
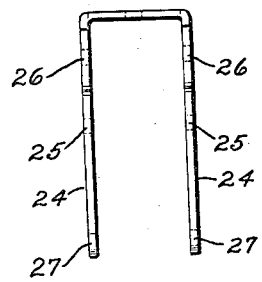
Figures 9, 10:
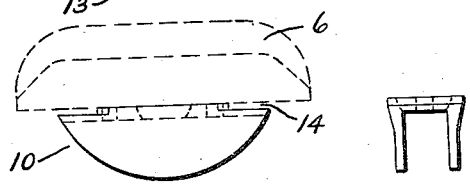
Figs. 9 and 10 are side and end views respectively of Fig. 8.

The shoe support 10 when secured to the shoe 6 as shown by the dotted-in shoe in Fig. 9 will provide a space 14 between the support and the shoe and is due to the raised portion 15 upon which the shoe 6 rests. The projecting portion 15 has curved ends 16 the center of radius being the center of the hole 13. The space 14 is sufficient to receive therein body member 17 which is formed preferably of sheet metal and shown in Figs. 5, 6 and 7.

The body has a top portion 18 which has aperture 19 with curved ends 20 the radius of which is the same as that for the ends 16 in the support 10 but the width of the aperture is somewhat greater than the width of the portion 15, therefore, it will be seen that the member 17 may pivot relative to the member 10 and the shoe 6 in a substantially horizontal plane and will also pivot relative to the support 4 in a vertical plane but in this case the support 10 and the shoe 6 will pivot with the member 17.

The holes 21 are to receive the screws 22 for securing the shoe 23 to the member 17.

The member 17 has spaced and downwardly projecting sides 24 and the sides are provided with registering openings 25 and 26 and also with a plurality of openings 27.

When the member 17 is mounted between the support 10 and the shoe 6, the shoe 23 secured thereto will be in substantial alinement with the shoe 6 and both shoes will be free to contact with the trolley wire 9. In order to maintain the shoe 23 in contact with the trolley wire I provide a spring 28 positioned on each side of the member 17 and secured in position by means of the pin 29 and through pin 30 positioned in the holes 25. This spring is biased to move the shoe 23 upwardly.

Mounted between the sides 24 is an adjustable carrier 31 having a spray gun 32. This carrier is pivotally mounted by means of the screw 33 and passes through a lug 34 on the member 31 and this lug is threaded to cooperate with the screw 33 and by rotating the screw in the proper direction the lug 34 will be moved laterally in one direction or the other thus adjusting the upper end of the carrier 31. The screw 33 is then locked into position by the nut 35. The lower end of the carrier is provided with oppositely disposed projecting bosses 36, the combined length of which substantially equals the space between the sides 24. The bosses 36 are apertured to receive the screw 37 also passing through one of the holes 27. It will be seen that the lower end of the carrier 31 may be swung longitudinally about the pin 23 by placing the screw 37 in the desired hole 27 thus adjusting the nozzle 38 vertically with respect to the wire 9. Adjustments of the screw 33 will move the nozzle laterally relative to the wire 9.

Having adjusted the position of the gun relative to the member 17 it will be evident that any movement of the member 17 is transmitted to the gun 32.

The movement of the member 17 and shoe 23 about the vertical axis x—x of the support 4 and relative to the shoe 6 permits the device to move around a curve or through overhead devices much more freely than if the shoes 6 and 23 were held in fixed alinement. The shoes 6 and 23 will guide the gun 32 relative to the wire.

The carrier 31 is provided with a portion forming a slot 39 which receives the handle 40 of the gun 32. The device may be made to take one of the standard spray guns upon the market.

I am not claiming any new and novel features in connection with the gun 32 as there are many types and constructions now on the market but I prefer a gun in which the fluid to be sprayed is led into and through the gun under pressure and is sprayed by means of air pressure, both the fluid and the air emerging from the nozzle 38 simultaneously.

Figure 11:
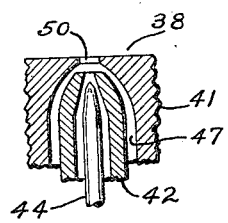
Fig. 11 is a sectional view of the upper or outlet portion of the spray gun.

In Fig. 11 I have indicated a portion of the outlet or nozzle and which may consist of an outer casing 41 and an inner tube 42. The inner tube is connected to the conduit 43 which supplies the spray material to the gun and the outlet of the tube 42 is controlled by a needle valve 44 and which in turn is operated to an open position by means of the lever 45 and is preferably held closed by a spring. The amount to which the needle valve can be set is by means of adjusting screw 46. The space 47 between the members 41 and 42 permits of the air escaping in combination with the flow of the material and is connected to the air conduit 48. An adjusting screw 49 positioned in the conduit 48 in the gun permanently sets the amount of air which can pass through the gun. When the device is in use I prefer to have the air escaping constantly as this tends to keep the outlet 50 free of material and whenever the needle valve 44 is closed it will clean the outlet in the tube 42.

The entire device thus described is mounted upon a trolley pole 2 and which is secured at the lower end of the roof of a moving vehicle and as is well known a spring at the lower end of the trolley pole is constantly urging the upper end of the pole to move upwardly.

Conveniently located on the vehicle is a receptacle 51 to which are connected the conduits 43 and 48 and the conduit 43 leads adjacent the bottom of the receptacle and the conduit 48 leads from the top of the receptacle. Air is brought into the receptacle from any source on the car through the conduit 52 and through a pressure regulator 53. The receptacle may be supplied with a pressure gauge 54 if desired.

The flow of material and air to the conduits 43 and 48 may be controlled at the reservoir 51 by means of the valves 55 and 56 respectively. The carrier 31 may be provided with an opening 57 therethrough and in which may be positioned one of the conduits as, for instance, 43. The reservoir 51 may be located anywhere convenient on the vehicle as for instance in the front or rear vestibule or if desired it may be located on the roof near the trolley base.

In the operation of my invention I prefer to mount the same upon a special vehicle set apart for the work of lubricating the trolley wire.

The mechanism is preferably mounted upon the end of a trolley pole or other equivalent support. The apparatus may be controlled by an operator positioned on the roof of the vehicle or on the back platform. In either case it may be desirable to provide the lever 45 with a rope or cord 58 by means of which the lever 45 may be operated to move the needle valve 44 to its open position and the member 17 is provided with a cord or rope 59 by means of which the operator may remove the rear shoe 23 out of contact with the trolley wire and this is quite desirable when the car is passing overhead switches, frogs, crossings, etc. This will permit the shoe 6 to remain in contact with the overhead structure and the current through the motors will not be broken. If desired the shoe 6 may also be removed from the trolley wire if a continued pull is exerted upon the rope 59 sufficient to overcome the tension of the spring in the trolley pole base. The spring operating the needle valve 44 is much weaker than the spring 28 and the spring 28 in turn is much weaker than the trolley base spring.

The lubricating material may be of many different combinations as desired but I prefer to use a material containing a large percentage of graphite held in suspension in a fluid and of the consistency of cream. This I find will work quite satisfactorily through the gun and if it contains a quick-drying material it will "set" quite rapidly upon its deposit upon the wire.

The reservoir is connected to the air brake system on the car and the regulator is set to give approximately twenty pounds pressure within the receptacle although other pressures may be used as required. This pressure upon the material 60 will force the same through the conduit 43 to the air gun and simultaneously air will pass from the receptacle through the conduit 48 to the gun and will escape through the nozzle, depending upon the amount permitted by the adjustment of the screw 49. Upon pulling the rope 58 the needle valve 44 will open and permit the material to be forced through the nozzle 38 and deposited upon the wire 9. The combination of the material and air at the nozzle will tend to break up the material and spray it in a fine mist upon the surface of the wire. The material may be of such a nature that it will clog the opening of the tube 42 and when this occurs the obstruction can be relieved by releasing the rope 58 permitting the needle valve to close the opening in the tube 42 and simultaneously remove the obstruction and the air which blows constantly through the nozzle will also assist the needle valve in removing the obstruction.

The position of the gun with respect to the trolley wire is suggested as hereinbefore stated and its position with respect to the trolley wire will remain substantially constant even though the angle of the trolley pole 2 with respect to the trolley wire may vary due to the height of the trolley wire varying and this is due to the fact that the relation between the gun and the shoe 23 is fixed and the relation of the shoe 23 to the trolley wire is fixed regardless of the angle of the pole with respect to the trolley wire.

I have used the terms horizontal and vertical and it will be recognized that when so used they are not necessarily actual but may be substantially so or approximate. The axis $x$—$x$ of the support 4 will not always be exactly vertical because it is fixed relative to the axis of the pole 2 and the axis of the pole 2 is not constant relative to a horizontal plane.

The conduits 43 and 48 should be flexible and rubber hose will serve the purpose.

There will be many modifications to my invention which will suggest themselves to those skilled in the art after having read the above description and therefore I wish to be limited only by my claims.

I claim:—

1. A spray apparatus comprising a body, a pair of current collectors secured to the body, a support for the body, means to secure the support to a trolley pole, a spray gun mounted on the body, the collectors arranged to contact with a trolley wire and the gun arranged to spray material upon the wire and means to adjust the relation of the gun to the collectors to vary the position of the gun nozzle to the trolley wire.

2. A spray device comprising a body, a support for the body, a pair of sliding current collectors in longitudinal alinement to contact with a trolley wire and each pivot upon the support, means to secure the support to a trolley pole, a spray gun mounted upon the support and having a nozzle directed at the lower face of the wire to spray a liquid thereon, means associated with the gun to control the flow of liquid through the gun and means to operate the control means from a point remote from the gun.

3. A spray device comprising a support member, current collecting mechanism mounted on the support, a spray gun mounted on the support and having a nozzle in longitudinal alinement with the collecting mechanism, means to adjust the position of the gun nozzle in a lateral direction and means to adjust the position of the gun nozzle in a vertical direction relative to the collecting mechanism.

4. A spray apparatus comprising a support, a current collector mounted thereon to engage a trolley wire, a spray gun, a supporting means for the gun comprising means secured to the gun and pivotally mounted on the support to hold the gun relative to the collector, yielding means urging the gun towards the wire, means to hold the gun in alinement with the wire, means to adjust the gun transversely of the wire, means to conduct a fluid to the gun, means to control the flow of the fluid through the gun and means to conduct air to the gun.

5. A spray device comprising a support, a pair of grooved members to engage and follow along a trolley wire and movable relative to each other in a substantially horizontal plane, one member trailing the other, a spray gun, means pivotally secured to the support to mount the members and gun in predetermined relation to each other and to the support, and yielding means constantly urging the said means to pivot on the support and holding the trailing member in contact with the wire.

6. Apparatus for spraying a trolley wire comprising a body, a pair of aligned and grooved members to engage the trolley wire and slide therealong and guide the body relative to the wire, a support for the body and grooved members, fluid discharge mechanism mounted on the body and arranged to apply a fluid coating material to the trolley wire and means to adjust the relation of the mechanism to the grooved members to vary the position of the mechanism to the trolley wire.

7. A spray device for a trolley wire comprising a support, a member mounted on the support to engage with the trolley wire and guide the support relative to the wire, a spray gun mounted on the support and having a nozzle in longitudinal alignment with the grooved member, means to adjust the position of the nozzle in a lateral direction and means to adjust the position of the nozzle in a vertical direction relative to the grooved member.

8. Apparatus for applying a coating to a trolley wire comprising a support, a grooved member mounted on the support to engage with the trolley wire and guide the support, fluid discharge mechanism mounted on the support to pivot relative to the grooved member in a horizontal plane and having a nozzle in alignment with the grooved member and means to adjust the position of the said nozzle relative to the grooved member.

9. Apparatus for lubricating a trolley wire comprising a guide member to engage with the trolley wire and guide the apparatus relative to the wire, lubricating means movable in a substantially horizontal plane relative to the guide member for applying a fluid lubricating material to the wire, a support for the guide member and the said lubricating means and means to supply the lubricating fluid to the said lubricating means and spring means constantly urging the lubricating means towards the wire when the apparatus is in use.

10. A spray apparatus comprising a support, a guide mounted thereon to engage a trolley wire and guide the support relative to the wire, a spray gun, a supporting means for the gun comprising means secured to the gun and pivotally supported by the support to hold the gun relative to the guide means, yielding means urging the gun supporting means and the gun towards the wire, means associated with the gun supporting means and arranged to engage the wire to hold the gun in alignment with the wire, means to adjust the position of the gun transversely of the gun supporting means to align the gun with the wire, means to conduct a fluid to the gun, means to control the flow of the fluid through the gun and means to conduct air to the gun to clear the gun nozzle of lubricant.

11. Apparatus for applying a coating material to a trolley wire comprising a body, a pair of aligned guide members which engage the trolley wire and slide therealong and guide the body relative to the wire, a support for the body and guide members, coating means to apply the coating material to the wire and means to adjust the relation of the coating means to the guide members to vary the position of the coating means relative to the trolley wire.

12. A lubricating apparatus comprising a support, guide means mounted on the support to engage a trolley wire, lubricant applying means and means supported by the support to hold the lubricant applying means in longitudinal alignment with the guide means, means to adjust the lubricant applying means laterally relative to the guide means and means to adjust the position of the lubricant applying means in a vertical direction relative to the support.

13. Apparatus for lubricating the trolley wire as it moves along the wire comprising guiding means to engage the trolley wire and guide the apparatus relative to the wire, lubricating means movable in a substantially horizontal plane relative to the guiding means as the apparatus moves along the trolley wire for applying a fluid lubricant to the wire, a pivotal support for the lubricating means and the guiding means, means to supply the lubricating means with the fluid lubricant and yielding means constantly urging the lubricating means to pivot relative to the support and toward the trolley wire.

14. A lubricating apparatus for trolley wires comprising a lubricator for applying a fluid lubricant to the lower surface of the trolley wire, a guide to engage the wire and position the apparatus relative thereto and spaced from the lubricator, a support for the guide and the lubricator, the lubricator and the guide mounted to pivot relative to each other in a substantially horizontal plane as the apparatus passes through an overhead curve construction and both the guide and the lubricator to pivot relative to the support in a substantially horizontal plane and a substantially vertical plane and an auxiliary guide positioned intermediate the first guide and the lubricator to guide the trailing end of the lubricator relative to the wire without preventing the said relative pivoted movement of the lubricator and first guide and spring means constantly urging the lubricator toward the wire.

FRED R. DIPPMAN.